Oct. 18, 1966
H. W. GILL
3,279,282
SAW GRINDER
Filed Jan. 20, 1964
4 Sheets-Sheet 4
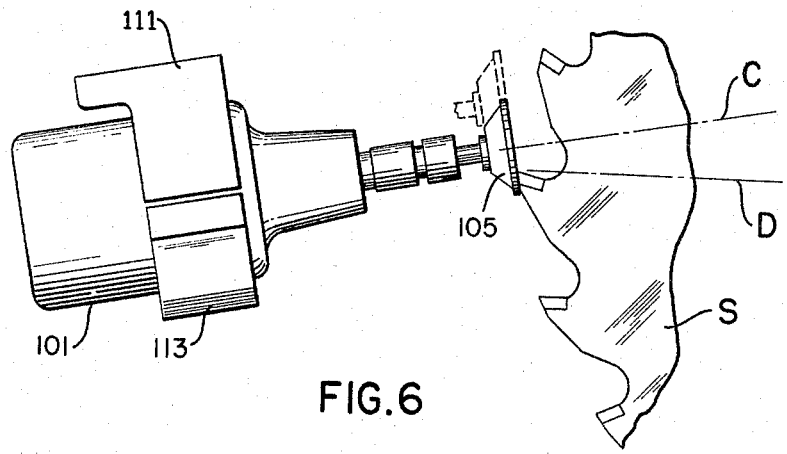
FIG.6
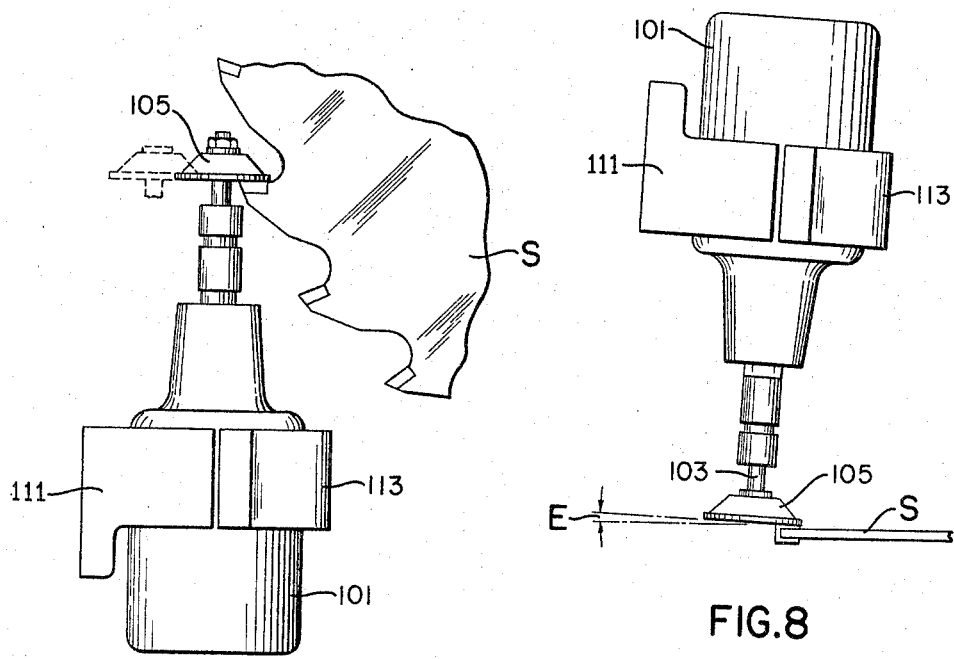
FIG.7
FIG.8

United States Patent Office 3,279,282
Patented Oct. 18, 1966

3,279,282
SAW GRINDER
Harlan W. Gill, Pittsford, N.Y., assignor to Huther Bros. Saw Mfg. Co., Inc., Rochester, N.Y., a corporation of New York
Filed Jan. 20, 1964, Ser. No. 338,678
7 Claims. (Cl. 76—40)

This invention relates to a saw grinder, and more particularly to a saw grinder especially but not exclusively adapted to grinding carbide teeth on circular saws.

An object of the invention is the provision of a generally improved and more satisfactory saw grinder of this kind.

Another object is the provision of a saw grinder of such economical construction that even a relatively small shop using carbide saws can afford to have one of these grinders, in order to keep its saws in the most efficiently sharpened condition at all times.

Still another object is the provision of a saw grinder so designed and constructed that it can be easily operated by a relatively inexperienced person.

A further object is the provision of a grinder so designed as to operate effectively on circular saws of a large range of sizes; for example, varying in diameter from 1½ inches to 38 inches or more.

A still further object is the provision of a grinder which, in a single relatively simple mechanism, has sufficient adjustments to enable the grinding of all necessary surfaces of a carbide tooth on a circular saw, with a wide range of hook angle, top clearance angle, and side clearance angle.

Another object is the provision of such a grinder in which the adjustments for grinding different faces of the teeth of a saw, and for adjusting the angle at which each such face is ground, are relatively simple and easy to perform.

An additional object is the provision of a saw grinder which, although intended mainly for grinding carbide teeth, may also be used for grinding teeth of material other than carbide.

These and other desirable objects may be attained in the manner disclosed as an illustrative embodiment of the invention in the following description and in the accompanying drawings forming a part hereof, in which:

FIG. 4 is a plan of a saw rest as used for saws of relatively small diameter;

FIG. 5 is a side elevation thereof, with parts broken away;

FIG. 6 is a view showing the action of the grinding wheel with relation to the saw when grinding the top of the saw tooth at a predetermined top clearance angle;

FIG. 7 is a similar view showing the grinding of the front face of the saw tooth at a predetermined hook angle; and FIG. 8 is a similar view showing the grinding of the side surface or flank of the saw tooth at a predetermined flank or side clearance angle.

Figure 1:
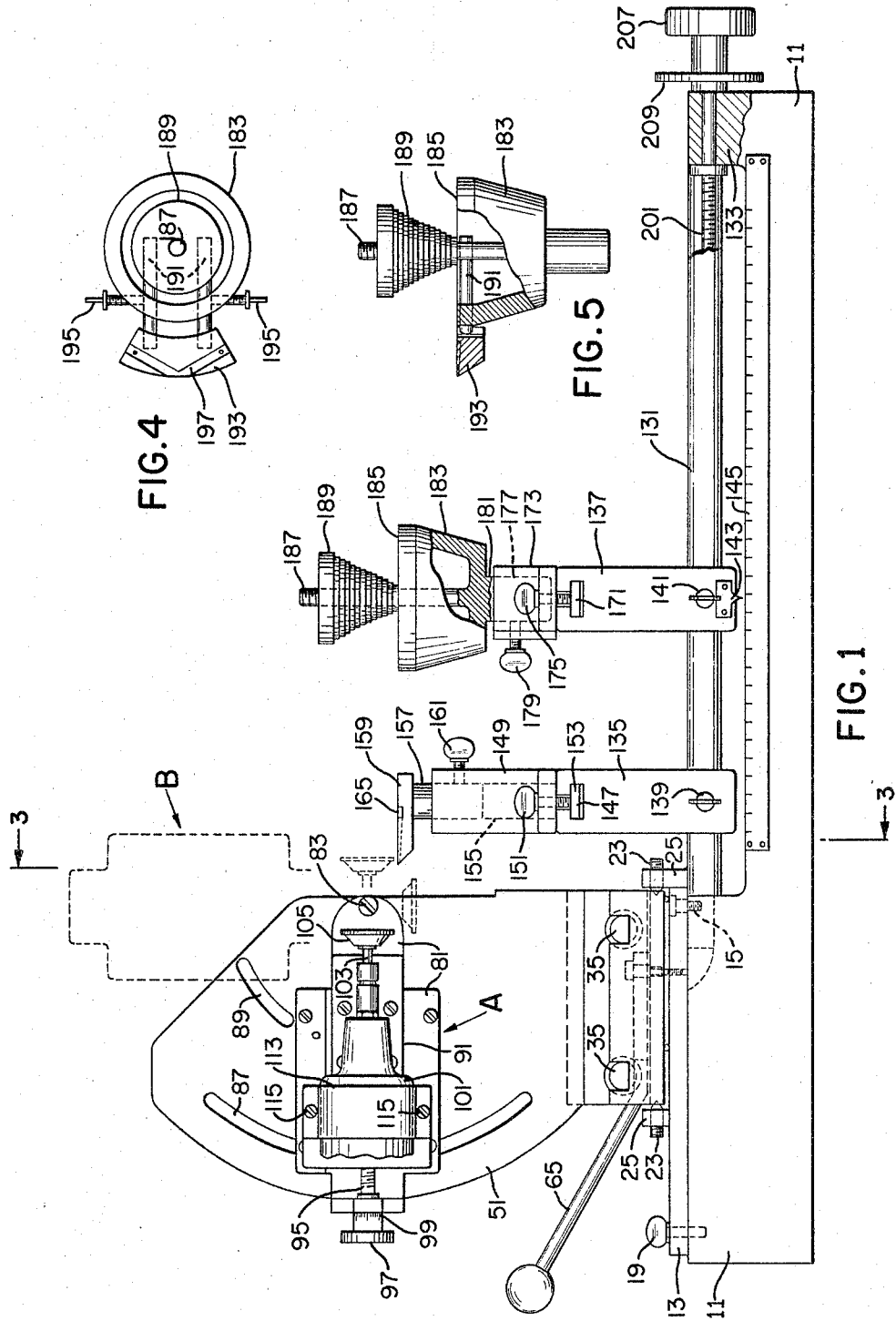
FIG. 1 is a front elevation of a saw grinder in accordance with a preferred embodiment of the invention, showing the parts in one position of adjustment, and also showing in dotted lines the grinding head mount moved to a different position of adjustment.
Figure 2:
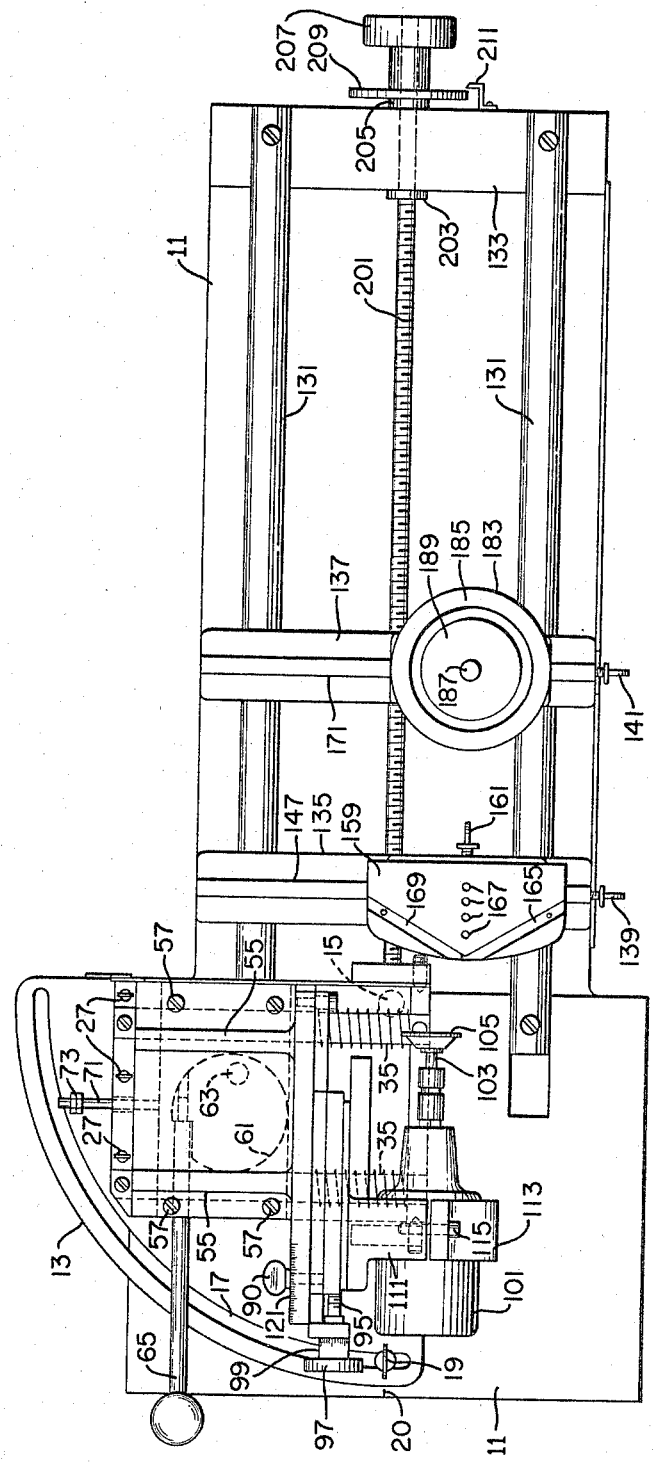
FIG. 2 is a plan view of the machine.
Figure 3:
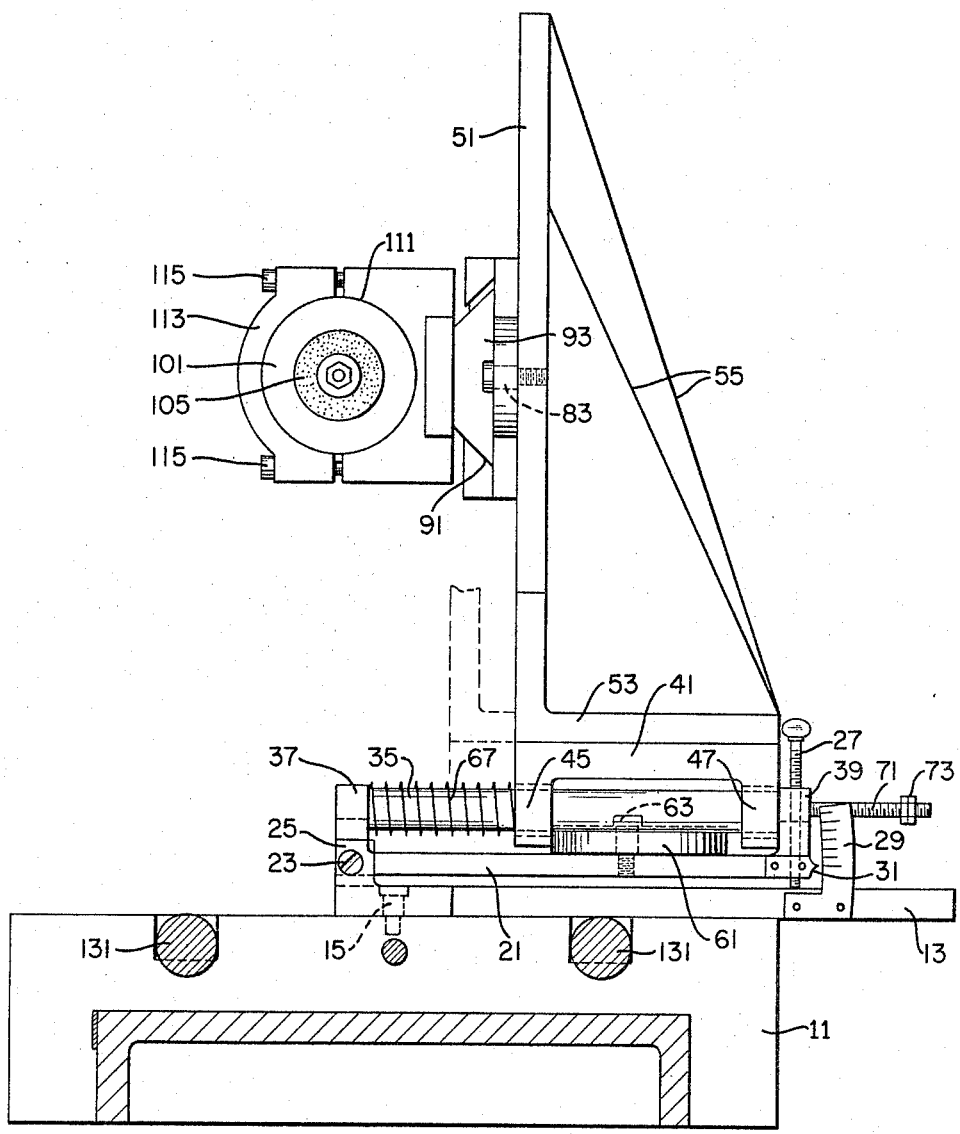
FIG. 3 is an end view thereof.

Referring now to FIGS. 1–3, the grinding machine comprises a base 11 of substantial size in a horizontal direction, adapted to rest upon any suitable table or bench of sufficient strength and rigidity. The right hand portion of the base carries the saw rest or saw supporting mechanism which will be further described below. The left hand portion of the base has a smooth flat top on which a quadrant plate 13 rests, the quadrant plate being horizontally swingable on the base 11 around a vertical pivot 15. An arcuate slot 17 in the plate 13, concentric with the pivot 15, is engaged by a thumb screw 19 screwed into the base 11, which serves to hold the plate 13 in any desired position of rotary adjustment relative to the stationary base 11. The arcuate edge of the quadrant plate is graduated in degrees, the scale being read in conjunction with a fixed index mark 20.

On the quadrant plate 13 there is a support plate 21 mounted approximately horizontally but capable of tilting movement through a limited range. Near the forward edge of this plate the lateral side edges have conical bores which receive the conical ends of pivots 23 mounted in upstanding lugs 25 on the quadrant plate 13. The rear edge of the support plate 21 has vertical tapped openings through which three long thumb screws 27 extend, these thumb screws projecting below the bottom face of the support plate 21 and resting upon the top surface of the quadrant plate 13, thereby supporting the rear edge of the support plate 21 at a variable height (depending upon the adjustment of the thumb screws 27) whereas the front edge is supported at a fixed height by means of the pivots 23. The preferred range of adjusting movement of the support plate 21 is about 7 degrees upwardly from a horizontal position of parallelism with the quadrant plate 13. The extent to which the support plate 21 is adjusted upwardly may be read by means of a graduated scale 29 fixed to one edge of the quadrant plate 13 and cooperating with a pointer 31 fixed to one edge of the support plate 21. The scale 29 is preferably graduated in degrees.

Fixed to the support plate 21 are two guide rods 35 which are parallel to each other and extend in a direction perpendicular to the pivotal axis formed by the pivots 23. These guide rods 35 extend between and are suitably fixed to an upstanding flange 37 at the front edge of the support plate 21 and a similar upstanding flange 39 at the rear edge thereof.

Slidably mounted on the guide rods 35 is a grinding table carriage having a flat top plate 41 and downwardly extending flanges 45 and 47 at its front and rear edges, respectively. These flanges 45 and 47 have openings for snugly and slidably receiving the guide rods 35, so that the carriage 41, in which case theb ase flange 53 is omitted. guide rods 35. Formed integrally with this carriage or, preferably, formed as a separate piece secured to the carriage, is a grinding table comprising an upstanding flange 51 and a base flange 53, together with strengthening ribs or flanges 55 extending obliquely upwardly from the rear edge of the base flange 53 to the top edge (or a point near the top edge) of the upstanding flange 51. As above stated, this grinding table may be made integral with the carriage 41, in which case the base flange 53 is omitted. But preferably it is a separate piece, the bottom of the base flange 53 resting on the flat top of the carriage 41 and being firmly secured thereto by suitable bolts or screws such as those shown at 57. The parts 41, 45, 47 together with the parts 51, 53, 55 may collectively be referred to as the grinding table carriage assembly.

For moving the grinding table carriage assembly along the guide rods 35, there is a cam 61, which may conveniently be in the form of a circular plate lying on the top face of the support plate 21 and pivoted thereto on a pivot 63 which is eccentric with respect to the circular outline of the cam member 61, as best seen in FIG. 2. A handle 65 is rigidly connected to the cam 61 and extends outwardly in a generally tangential and slightly upward direction to an accessible position where the ball at the end thereof may be conveniently grasped by the hand of the operator. When this handle is swung in a forward direction from the position shown in FIG. 2, the rotation of the cam 61 on its pivot 63 will cause the edge of the cam to engage the rear face of the depending flange 45 on the grinding table carriage (see especially FIGS. 2 and 3) and thus will move the carriage forwardly along the rods 35, toward the front edge of the support plate 21 (that is, toward the edge at which the pivotal axis 23 is located). This forward movement of the carriage is resisted by coiled springs 67 which surround the rods 35 and react rearwardly against the carriage flange 45 and forwardly against the fixed flange 37 on the support plate 21. The action of the cam 61 easily overcomes the resistance of these springs 67. When the cam handle 65 is turned in the opposite direction, relieving the forward pressure of the cam on the carriage, the springs 67 restore the carriage in a rearward direction, keeping it constantly engaged with the cam 61. It will be noted from FIGS. 2 and 3 that there is clearance between the rear edge of the cam and the rear flange 47 of the carriage, so that the rearward motion of the carriage is produced by the springs 67, rather than by any rearward pressure exerted by the cam. However, if it is preferred for any reason, the springs 67 can be eliminated and the rearward motion of the carriage, like the forward motion thereof, can be produced by direct cam pressure, in this case the cam pressure being between the rear edge of the cam and the rear flange 47 of the carriage, and the cam itself being of a diameter to fit snugly between the flanges 45 and 47, instead of being slightly smaller than the space between these flanges.

Under many conditions it is desired to have a definite limit to the extent of movement or stroke of the carriage along the rods 35, especially when grinding a saw of relatively small size, in order to prevent the grinding wheel from accidentally moving too far and cutting into the next tooth or other undesired part of the saw. For this purpose, there is an adjustable motion limiting device on the carriage, in the form of a threaded rod 71 fixed to the carriage and projecting rearwardly therefrom through a suitable opening in the upstanding flange 39 of the support plate 21. Rearwardly of this flange 39, the rod 71 has lock nuts 73 which can be adjusted to various positions along the threaded length of the rod 71, thereby forming a limit stop to limit the extent to which the carriage may move forwardly along the rods 35. The normal rearward position of the carriage is determined by contact of the rear face of the flange 47 of the carriage with the forward face of the upstanding flange 39 on the support plate 21.

The front face or working face of the grinding table 51 has quite a large area, as will be readily understood from FIG. 1, in order to allow adequate range of adjustment of the grinding head thereon. A mounting plate 81 in the form of a guideway member is pivotally mounted on this front face of the table 51 by means of a pivot 83 at its right hand end, and can swing arcuately up or down on this pivot 83. Arcuate slots 87 and 89 are formed in the table 51, concentrically with the pivot 83. A thumb screw 90 extends forwardly from the rear of the table 51, through one or the other of the arcuate slots and into a tapped opening in the rear of the mounting plate 81, to hold the plate in any desired position of angular adjustment about the pivot 83.

The plate 81 has a longitudinally extending dovetailed guideway best seen in FIG. 3 and indicated in general at 91. Movable longitudinally along this dovetailed guideway is a correspondingly dovetailed slide 93, feedable longitudinally by means of a manually operable feed screw 95 (FIGS. 1 and 2) head 97 of which is preferably provided with suitable graduations 99 graduated in terms of linear length of feed, to indicate to the user the extent of feed in any particular operation.

Mounted on the slide 91 is a grinding head motor 101 having an armature shaft 103 on which is mounted the grinding wheel 105. This is preferably a cup shaped wheel, and when it is to be used for grinding carbide tipped saw blades, the grinding wheel is of the diamond bearing or diamond impregnated type. If ordinary steel saw blades are to be ground, rather than carbide saw blades, any other suitable type of grinding wheel is substituted, such as a ceramic wheel or ordinary abrasive wheel.

The motor is held on the slide 93 preferably by forming on the slide an approximately semi-cylindrical hollowed out space or saddle 111, fitting around approximately half of the circumference of the cylindrical motor housing, the motor being held in the saddle by an approximately semi-cylindrical strap 113 extending around approximately the other half of the circumference of the motor housing, held to the saddle by bolts 115. Upon loosening the bolts 115, the entire motor housing may be moved longitudinally to a limited degree in the saddle, thereby obtaining a further range of longitudinal adjustment movement in addition to the range of movement obtained by means of the feed screw 95 feeding the entire slide 91 along the guideways on the plate 81. Normally no such additional range of feeding is necessary and all necessary adjustments can be made by means of the feed screw 95, but it is convenient to have the additional range of longitudinal movement available by moving the entire motor in the saddle, to take care of unusual situations.

From what has been said above, it will be apparent that the entire grinding motor, the slide 91 on which it is mounted, and the plate 81 on which the slide is mounted, can all be swung in an approximately vertical plane on the pivot 83, being held in any selected position by tightening the thumb screw 90 (FIG. 2) which goes through one of the arcuate slots 87 or 89, as the case may be, and into a tapped opening in the rear of the plate 81. The position shown in full lines at A in FIG. 1 is a position in which the axis of the motor shaft is horizontal. Preferably the lengths of the arcuate slots 87 and 89 and the proportions of the parts are such that the grinding head may be swung down to an extent of approximately 45 degrees downwardly from the A position shown in FIG. 1, and may be swung upwardly to approximately 90 degrees or even a trifle more than 90 degrees from the A position, to the position shown in dotted outline at B.

The arcuate edge of the grinding table 51 is graduated with a suitable scale 121 (FIG. 2) reading preferably in degrees, and cooperating with a suitable index mark on the plate 81, to indicate the extent to which the plate is swung upwardly or downwardly from its horizontal position A shown in FIG. 1.

Reference is now made to the saw holding parts of the machine, as shown especially in FIGS. 1 and 2. The right hand portion of the base, to the right of the plate 13, is somewhat narrower, in a front to back direction, then the left hand portion on which the grinding mechanism is mounted, as seen in FIG. 2, and also is shallower or of lesser height than the left hand portion, as seen in FIG. 1. Two guide rods 131 are arranged in stationary position on the base, parallel to each other and extending horizontally from their left ends which are attached to the higher left hand portion of the base, to their right ends which are attached to an upstanding flange 133 at the right end of the base 11. Two bridge-like slides extend crosswise of the rails 131, bridging the space from one to the other, and are movable longitudinally along the rails. The left hand one of these slides is indicated at 135, and the right hand one at 137. They may be held in fixed position on the rails 131 by thumb screws 139 and 141, respectively. The right hand slide 137 carries an index pointer 143 which, when the slide is moved, travels along a scale 145 which extends along the front edge of the base 11, graduated in suitable units of linear measurements such as inches, to indicate the proper position of the slide 137 for holding a saw of a given nominal diameter.

The first or left hand slide 135 has a T-slot 147 extending longitudinally along its top edge (that is, at right angles to the length of the guide rails 131) and carries on its top edge a bracket 149 held in any desired adjustable position on the slide 135 by tightening a thumb screw 151, the shank of which goes down into a nut 153 in the wide part of the T-slot 147. The bracket 149 has a vertical bore 155 which receives snugly a shank 157 on the saw supporting table 159. A thumb screw 161 threaded through the side wall of the bracket 149 and bearing against the shank 157, serves to hold the saw table 159 at any desired elevation.

The saw supporting table 159 has the shape best seen in plan in FIG. 2, and has in its top surface a V-shaped groove 165, as well as a series of vertical tapped bores 167 at various intervals in a right and left direction, as well seen in FIG. 2. A flat leaf spring 169 of conventional kind may be mounted in either half of the groove 165, the free end of the spring (near the junction of the two arms of the V-groove) projecting upwardly slightly above the upper surface of the saw table 159 to form a locating stop for successive teeth of the saw which is being ground.

The other or second slide 137 on the rails 131 has along its top edge a T-slot 171 similar to the T-slot 147 in the first slide. A bracket 173 is adjustably mounted on the top edge of the slide 137, and is held in any adjusted position thereon by the thumb screw 175 operating similarly to the thumb screw 151 previously described. The bracket 173, like the bracket 149, has a vertical bore 177, but the height of this bracket is considerably less than that of the bracket 149, as seen in FIG. 1. Like the previously mentioned bracket, the bracket 177 has a lateral thumb screw 179, the end of which engages the shank 181 of the saw supporting member 183, to hold this shank at any desired adjusted position of elevation.

The member 183 is conveniently in the form of a hollow cup shaped member, having a rim 185 on which the flat side of a circular saw blade may rest, and also having an upstanding central stud 187 which is adapted to receive the central aperture in a stepped cone centering member 189, which extends into the arbor hole at the center of the saw which is to be ground, in order to center the saw properly on the stud 187. Because of the hollow construction of the support 183, the stepped cone 189 can travel down the stud 187 as far as may be necessary to have one step of the cone engage snugly in the arbor hole of the saw blade.

For saws or cutters of very small diameter (say, for example, 1½ to 5 inches) the saw blade rests horizontally on the support 159 on the first slide 135, and is rotatably held thereon by a vertical bolt going down through the arbor hole of the saw and an adapter bushing therein, and into one or another of the tapped openings 167 in the support 159. For a saw of large diameter (say, for example, 10 to 38 inches) the saw rests horizontally on the upper edge 185 of the support 183 on the second slide 137, with the stepped cone 189 in the arbor hole and with the edge of the saw resting on the support 159 adjacent the grinding wheel. But for an intermediate size of saw, too large to be carried entirely by the support 159, and too small to be carried by the support 185 with its edge resting on the support 159, a different arrangement is conveniently used. This different arrangement, for saw blades of an intermediate size of 5 to 10 inches in diameter, is shown in FIGS. 4 and 5.

The cup shaped member 183 is provided, a little below its upper edge 185, with two horizontal bores parallel to each other and straddling the central axis of the member 183. Adjustably movable in these bores are two parallel arms 191 attached to a supplementary saw support 193 having the shape shown in FIGS. 4 and 5. Thumb screws 195 extending laterally into threaded openings in the member 183 bear against the rods 191 on the supplementary saw support, serving to hold the rods in any desired position, with the support 193 closer to or farther away from the central axis of the support 183. Thus the saw of an intermediate size can be laid flat on the top edge 185 of the support 183, with the stepped cone 189 in the arbor hole, and the supplementary support 193 can be adjusted until it lies close to the edge of the saw, in the best position to support the edge of the saw while the teeth are being ground. The top surface of the supplementary support 193 has a V-shaped groove 197 for receiving a locating spring, like the groove 169 in the support 159.

Parallel to the rails 131 and preferably located midway between them, is a feed screw 201 (FIG. 2) held against longitudinal movement as by means of collars 203 and 205 engaging opposite faces of the upstanding flange 133. The major part of the length of the feed screw 201 is threaded, and engages in a tapped opening in the second slide 137, so that rotation of the screw by the crank or handwheel 207 at the right end thereof will cause a fine feeding movement of the slide 137 along the rails or rods 131. The extent of such feeding movement can be read from a graduated scale plate 209 fixed to the feed screw 201, in conjunction with a stationary pointer or index mark 211. The feed screw passes loosely through a smooth bore in the first slide 135, so that rotation of the screw does not feed this slide directly. However, during certain grinding operations the two slides 135 and 137 are brought tight against each other and are fastened together by a clamp screw going through one slide and into a tapped hole in the other. Then the two slides will travel together as a unit, when the feed screw 201 is turned.

In addition to the structure described above, the complete grinidng machine preferably has a suitable coolant or lubricant system, and suitable splash guards for the coolant or lubricant, all of these parts being conventional and therefore not illustrated nor specifically described herein.

In the use of the machine, saws of large diameter, such as a diameter of from 10 inches to 38 inches, for example, are mounted in a horizontal position on the top edge 185 of the rest 183, centered with respect to the post 187, and with the stepped cone 189 seated in the arbor hole of the saw. The slide 137 is moved to the required distance from the grinding head, by operating the handle 207 of the feed screw 201. The slide 135 is adjusted by hand to bring the rest 159 close to the edge of the saw blade in order to support the particular tooth which is to be ground at the time.

For saws of intermeidate size, say for example a diameter of 5 inches to 10 inches, the supplementary support 193 (FIGS. 4 and 5) is attached to the main support 183, and the saw blade is mounted as before on the top edge 185 of the support 183, with the supplementary support 193 adjusted radially inwardly or outwardly to the required point for supporting the tooth which is to be operated upon. The parts 149 and 159 are removed from the first slide 135, so that they will not be in the way of the supplementary support 193 when the slide 137 is moved up relatively close to the grinding head.

For grinding very small saws or cutters, such as those having a diameter from 1½ to 5 inches, the second slide 137 and main support 183 are not used, but the small saw blade or cutter is mounted directly on the support 159, by a bolt or screw passing downwardly through the arbor hole of the saw or cutter and through any necessary adapter bushing therein, into one or another of the holes 167 in the support 159.

The grinding operation itself is performed as follows: When it is desired to grind the top clearance angle of the saw tooth, the saw is positioned as shown approximately in FIG. 6, and the quadrant plate 13 is swung on the stationary base 11 so as to bring the axis C of the cutter to the required clearance angle relative to a radial line D from the tip of the tooth to the center of the saw, first loosening the thumb screw 19 and then tightening it again after the quadrant plate has been adjusted. The angle is read from the angle scale on the arcuate edge of the plate 13, in conjunction with the fixed index mark 20 on the base 11. Since the grinding head is supported from the quadrant plate 13, the entire grinding motor 101 will swing with the quadrant plate, and the grinding shaft 103 will likewise swing, of course, to bring its axis C to the required angle. The diamond wheel 105 is mounted on the shaft 103 with the convex side of the diamond wheel toward the motor 101 and with the concave side away from the motor, as shown in FIGS. 2 and 6.

The saw is moved the required distance toward the grinding head by operation of the handle 207 and threaded feed rod 201. The grinding wheel is fed by turning the feeding knob 97, so as to make the required depth of cut. The handle 65 of the grinding head mechanism is now operated, to rotate the cam 61, so that the action of this cam in conjunction with the action of the springs 67 will move the grinding head in a direction perpendicular to the axis C of the grinding shaft 103, moving the cutter 105 between the full line position and dotted line position shown in FIG. 6, to girnd the top of the tooth at the required clearance angle.

When it is required to grind the face of the tooth at the required hook angle, the quadrant plate 13 is swung further around on its pivot 15, approximately 90 degrees from the position shown in FIG. 2, to bring the grinding shaft 103 to a position approximately tangent to the saw, as illustrated in FIG. 7. The cup shaped diamond wheel 105 is reversed on the shaft 103, so that the concave side of the wheel is toward the motor and the convex side away from the motor, as also illustrated in FIG. 7. Then the operation of the handle 65 will move the grinding head perpendicular to the grinding shaft 103, moving the diamond wheel between the full line position and dotted line position of FIG. 7, thereby grinding the front face of the tooth of the saw.

When it is desired to grind the side face or lateral face of the tooth of the saw, the grinding head is moved to an almost vertical position by swinging the support plate 81 upwardly on its pivot 83, to the approximately vertical position shown in dotted lines at B in FIG. 1. In doing this, the wing nut 90 must be completely removed temporarily, since the arcuate slot 87 through which this wing nut normally extends is not sufficiently long to permit the plate 81 to swing up to the desired vertical position. When the plate 81 is swung to the desired position, the wing nut 90 is inserted through another arcuate slot 89, into a different tapped opening in the back of the plate 81, and is tightened to hold the plate 81 in the desired position.

In order to obtain the required side clearance angle for the grinding of the side of the tooth, the support plate 21 is swung up to the desired small angle relative to the quadrant plate 13, by tightening the thumb screws 27 which serve to raise the free edge of the support plate 21, until the required angle is obtained as read on the scale 29. This ability to tilt the entire grinding head a few degrees on the horizontal axis 23 is an important feature of the present machine, as it permits the easy grinding of the side surfaces of the tooth at the required clearance angle, which cannot be done easily with prior comparable mechanism. The slight angle desired for grinding this face is indicated at E in FIG. 8. When the parts have been set up to the required relative positions as shown in FIG. 8, the handle 65 is again operated which produces the desired grinding stroke, moving the grinding head in a direction perpendicular to the grinding shaft 103, to grind the side surface of the tooth of the saw S.

In each case, it will be noted that although great flexibility of adjustment of the grinding head is possible, to place the axis of rotation of the grinding wheel 105 in various directions, the grinding stroke produced by operating the handle 65 is always in a direction perpendicular to the axis of the grinding wheel and its shaft 103. In all positions of adjustment of the grinding head (that is, the motor and its shaft and grinding wheel) the shaft is parallel to the face of the grinding table 51, and the stroke action of the cam 61 is always perpendicular to the face of the grinding table 51. But the entire grinding table 51 can swing on the horizontal axis formed by the pivots 23, parallel to the face of the grinding table, and can also swing on the vertical axis formed by the pivot 15, the axis of which is also parallel to the face of the grinding table 51.

If it is desired to grind the teeth with alternate top bevel, the set up is similar to that illustrated in FIG. 6 for grinding the top clearance angle, except that instead of setting the plate 81 so that the grinding shaft 103 is truly horizontal, the plate 81 will be swung at the required slight angle upwardly or downwardly from the horizontal position. For example, it is swung slightly downwardly from the horizontal position shown in FIG. 1, and clamped in such position by the thumb screw 90, and then each alternate tooth of the saw S is ground, without grinding the intermediate teeth. Then the grinding head support plate 81 is readjusted to the same slight angle upwardly from horizontal, rather than downwardly, and the process is repeated on the intermediate teeth which were previously skipped.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. Carbide saw grinding apparatus comprising a stationary base, a guideway extending horizontally on said base, a saw holder movable along said guideway and adapted to hold a saw in a substantially horizontal position, a first support mounted on said base for horizontal swinging movement on a vertical pivotal axis, a second support mounted on said first support for upward and downward swinging movement on a horizontal pivotal axis, a third support slidably mounted on said second support for rectilinear movement relative thereto in an approximately horizontal direction perpendicular to said horizontal axis, a grinding head mounting plate mounted on said third support for upward and downward swinging movement on a pivotal axis parallel to the direction of rectilinear movement of said third support, a grinding head slide mounted on said mounting plate for sliding movement thereon in a direction perpendicular to said pivotal axis of said mounting plate, a grinding wheel mounted on said slide for rotation about an axis parallel to the direction of sliding movement of said slide relative to said mounting plate, said grinding wheel being adapted to engage and operate upon a tooth of a saw held by said saw holding member in various positions of orientation relative to the tooth, depending upon the respective positions of adjustment of said first, second, and third supports and said mounting plate relative to each other and to said base, and means for causing rectilinear movement of said third support relative to said second support to cause said grinding wheel to make an operating stroke relative to the saw tooth with which it is engaged.

2. Saw grinding apparatus comprising a stationary base, a guideway extending horizontally on said base, a saw holder movable along said guideway an adapted to hold a saw in a substantially horizontal position, a first support mounted on said base for horizontal swinging movement on a vertical pivotal axis, a second support mounted on said first support for upward and downward swinging movement on a horizontal pivotal axis, a third support slidably mounted on said second support for rectilinear movement relative thereto in an approximately horizontal direction perpendicular to said horizontal axis, a grinding head mounting plate mounted on said third support for upward and downward swinging movement on a pivotal axis parallel to the direction of rectilinear movement of said third support, a grinding head slide mounted on said mounting plate for sliding movement thereon in a direction perpendicular to said pivotal axis of said mounting plate, a grinding wheel mounted on said slide for rotation about an axis parallel to the direction of sliding movement of said slide relative to said mounting plate, said grinding wheel being adapted to engage and operate upon a tooth of a saw held by said saw holding member in various positions of orientation relative to the tooth, depending upon the respective positions of adjustment of said first, second, and third supports and said mounting plate relative to each other and to said base, a manually operated lever on said second support for sliding said third support relative to said second support in one rectilinear direction, to cause said grinding wheel to make a stroke in one direction relative to the saw tooth with which it is engaged, and spring means operatively interposed between said second support and said third support for sliding said third support relative to said second support in the opposite rectilinear direction.

3. A construction as defined in claim 1, in which said first support is in the form of a quadrant plate swingable horizontally on said stationary base through an angle of approximately 90 degrees.

4. A construction as defined in claim 2, wherein said second support has a pair of parallel rails on which said third support is slidably mounted, and wherein said second support carries an eccentrically mounted circular cam engaging a part of said third support to slide said third support along said rails, said manually operated lever being connected to said cam.

5. A construction as defined in claim 2, wherein said guideway for said saw holder includes two parallel rails extending in a general direction toward and away from said vertical pivotal axis on which said first support swings, and in which said saw holder includes a bridge member extending transversely from one rail to the other and a saw support member adjustably mounted on said bridge member for adjustment both in a vertical direction and in a direction along said bridge member transversely to the direction of said rails.

6. Saw grinding apparatus especially adapted for grinding carbide teeth on circular saws, said apparatus comprising means for holding a circular saw stationary with its central axis extending in one direction, a grinding head including a grinding wheel rotatable about a grinding wheel axis, means for holding said grinding head in position with said grinding wheel engaged with a tooth on said saw, means for adjusting the orientation of said grinding wheel axis relative to said saw holding means by swinging movements about a first adjustment axis parallel to the central axis of the saw and about a second adjustment axis in a plane perpendicular to the central axis of the saw and about a third adjustment axis in a plane perpendicular to the second adjustmnet axis, said grinding wheel axis being perpendicular to and substantially intersecting said third adjustment axis, and means for moving said grinding wheel through an operating stroke in a direction parallel to said third adjustment axis.

7. A construction as defined in claim 6, wherein said means for moving said grinding wheel through an operating stroke includes spring means tending to move said grinding wheel in one direction and manually operated cam means for moving said grinding wheel in an opposite direction against the force of said spring means.

No references cited.

GRANVILLE Y. CUSTER, JR., *Primary Examiner.*